(12) United States Patent
Stasiak et al.

(10) Patent No.: US 11,701,678 B1
(45) Date of Patent: Jul. 18, 2023

(54) PAINTING ROBOT

(71) Applicants: ABB Schweiz AG, Baden (CH); Piotr Stasiak, Bryne (NO); Takahiro Tawata, Tokyo (JP)

(72) Inventors: Piotr Stasiak, Bryne (NO); Takahiro Tawata, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/753,811

(22) PCT Filed: Jun. 29, 2020

(86) PCT No.: PCT/JP2020/025473
§ 371 (c)(1),
(2) Date: Mar. 15, 2022

(87) PCT Pub. No.: WO2022/003759
PCT Pub. Date: Jun. 1, 2022

(51) Int. Cl.
| | | |
|---|---|---|
| *B25J 13/08* | (2006.01) | |
| *B05B 13/04* | (2006.01) | |
| *B25J 11/00* | (2006.01) | |
| *B25J 19/00* | (2006.01) | |
| *B25J 9/16* | (2006.01) | |
| *B05B 12/08* | (2006.01) | |

(52) U.S. Cl.
CPC .......... *B05B 13/0431* (2013.01); *B05B 12/08* (2013.01); *B25J 9/1674* (2013.01); *B25J 11/0075* (2013.01); *B25J 13/087* (2013.01); *B25J 19/0025* (2013.01)

(58) Field of Classification Search
CPC . B05B 13/0431; B25J 9/1674; B25J 19/0025; B25J 13/087
See application file for complete search history.

(56) References Cited

U.S. PATENT DOCUMENTS

| | | | |
|---|---|---|---|
| 2009/0204260 A1* | 8/2009 | Bryne | ................ B05B 13/0292 901/43 |
| 2019/0001483 A1* | 1/2019 | Ishizu | .................... B25J 18/007 |

FOREIGN PATENT DOCUMENTS

| | | |
|---|---|---|
| CN | 103213397 A | 7/2013 |
| CN | 107234016 A | 10/2017 |
| CN | 107471638 A | 12/2017 |
| CN | 109070585 A | 12/2018 |

(Continued)

OTHER PUBLICATIONS

International Search Report, issued by the ISA/JP Japan Patent Office; regarding corresponding patent application Serial No. PCT/JP2020/025473; dated Aug. 18, 2020; 3 pages (English Translation).

*Primary Examiner* — Nathan T Leong
(74) *Attorney, Agent, or Firm* — Greenberg Traurig, LLP (57) ABSTRACT

An inkjet-type vehicle painting machine capable of keeping temperature elevation of a nozzle head to a certain temperature or less. The painting robot comprises a power supply means for supplying power to drive a piezoelectric substrate of a nozzle head, and a robot arm for moving the nozzle head. The nozzle head is provided in an explosion-proof housing equipped with an explosion-proof construction. A heat dissipation means that dissipates heat generated from the nozzle head within the explosion-proof housing is attached to the nozzle head. A temperature measurement means for measuring the temperature of the heat dissipation means is attached to the heat dissipation means.

15 Claims, 8 Drawing Sheets

(56) References Cited

FOREIGN PATENT DOCUMENTS

| | | | |
|---|---|---|---|
| JP | 60-78658 | A | 5/1985 |
| JP | H 6-72652 | U1 | 10/1994 |
| JP | 8-90471 | A | 4/1996 |
| JP | 10-230200 | A | 9/1998 |
| JP | 2008-514504 | A | 5/2008 |
| JP | 2011016319 | A | 1/2011 |
| JP | 2015-036127 | A | 2/2015 |
| JP | 2017-035693 | A | 2/2017 |
| JP | 2018-502702 | A | 2/2018 |
| WO | 2017183389 | A1 | 10/2017 |

\* cited by examiner

PAINTING ROBOT

CROSS-REFERENCE TO RELATED APPLICATIONS

This is a national stage application which claims priority to International patent application Serial No.: PCT/JP2020/025473, filed on Jun. 29, 2020; and which is herein incorporated by reference in its entirety.

FIELD

The present disclosure relates to a painting robot.

BACKGROUND

In painting lines of automobiles and other vehicles, robot painting using robots has become the mainstream. In such robot painting, a painting machine (rotary atomizing type painting machine) in which a rotary atomizing type painting head is mounted at the front end of a multi joint robot is used. However, as disclosed in Patent Literature 1, it is proposed to use an injection type painting machine for painting a vehicle. In addition, for example, Patent Literature 2 discloses painting with a spray pattern of a lengthy shape.

CITATION LIST

Patent Literature

Patent Literature 1: Japanese Unexamined Patent Application Publication No. 2017-035693
Patent Literature 1: Japanese Unexamined Patent Application Publication No. 2018-502702

SUMMARY

Technical Problem

Meanwhile, when driving an injection type nozzle head, heat is generated near the driving portion (piezoelectric substrate) thereof. If temperature rises due to such heat generation, the electrical characteristics may change in the characteristics of the electrically conductive parts including the piezoelectric substrate and the like, causing misoperation, damage and the like.

In addition, paint discharged from nozzles of the nozzle head changes its viscosity and other characteristics due to heat, which may lead to the deterioration of vehicle painting quality. Furthermore, although some paints contain organic solvents, it is not desirable for the temperature of the nozzle head to rise significantly when such paints containing organic solvents are being discharged.

Given the above-mentioned situation, the present disclosure has been made to provide a painting robot capable of suppressing the temperature rise of the nozzle head to be less than or equal to a constant temperature.

Solution to Problem

In order to solve the above problems, according to a first perspective of the present disclosure, it provides a painting robot configured to discharge paint towards the painting object from nozzles to perform painting, which is characterized by including: a nozzle head including a plurality of nozzles and discharging paint from the nozzles by driving of a piezoelectric substrate; a power supplier for supplying power for driving the piezoelectric substrate; and a robot arm with a front end to which the nozzle head can be mounted and moving the mounted nozzle head; wherein the nozzle head is provided, in a state in which the nozzle discharging surface thereof is exposed to the outside, within an explosion-proof housing that covers the portions other than the nozzle discharging surface, within the explosion-proof housing, a heat-release unit which release the heat generated from the nozzle head is mounted to the nozzle head, and within the explosion-proof housing, a temperature measuring unit which measures the temperature of the heat-release unit is mounted to the heat-release unit, the painting robot is provided with a power cut-off device which, in response to the temperature measuring unit detecting that a predetermined temperature has been reached, cuts off the power supply from the power supplier to the piezoelectric substrate based on the detection signal from the temperature measuring unit.

In addition, in the above disclosure, it is preferable that the explosion-proof housing has an internal pressure explosion-proof structure in which the internal pressure of the internal space thereof is higher than the pressure of the external atmosphere.

In addition, in the above disclosure, it is preferable that the explosion-proof housing has a pressure-resistant explosion-proof structure consisting of a pressure-resistant material.

In addition, in the above disclosure, it is preferable that the heat-release unit is a heat-release plate, and the heat-release plate is mounted to the side surface of the nozzle head intersecting with the nozzle discharging surface.

In addition, in the above disclosure, it is preferable that the explosion-proof housing includes a gas supplier mounted to a gas introduction opening formed in the explosion-proof housing, and a gas exhauster mounted to a gas exhaust opening formed in the explosion-proof housing, inactive gas is introduced from the gas supplier and exhausted from the gas exhauster.

In addition, in the above disclosure, it is preferable that the explosion-proof housing is provided with a cylindrical portion and an expanded portion expanded in a state that its size in the width direction is larger than the outer peripheral surface of the cylindrical portion, and the gas supplier is mounted on the expanded outer peripheral wall of the expanded portion facing the heat-release unit, so that the gas supplier sprays inactive gas towards the heat-release unit.

In addition, in the above disclosure, it is preferable that the gas exhauster is a gas control valve which is capable of adjusting the flow rate of inactive gas, and the gas control valve is mounted in the internal space of the explosion-proof housing and on the wall surface of the explosion-proof housing opposite to the gas supplier across the nozzle head.

In addition, in the above disclosure, it is preferable that it is provided with a controller that controls the operation of the gas control valve and controls the flow rate of the inactive gas exhausted from the gas control valve so that the internal pressure of the internal space is higher than the pressure of the external atmosphere.

Advantageous Effects of Disclosure

According to the present disclosure, it is possible to provide a painting robot capable of suppressing the temperature rise of the nozzle head to be less than or equal to a constant temperature.

DETAILED DESCRIPTION OF EMBODIMENTS

Hereinafter, painting robots of the embodiments of the present disclosure are described with reference to the drawings. Additionally, in the following description, X direction is set to the long direction of the nozzle discharging surface 52 (nozzle head 53), the X1 side is the right side in FIG. 2, and the X2 side is the left side in FIG. 2 as needed. In addition, Y direction is set to the short direction (width direction) of the nozzle discharging surface 52 (nozzle head 53), the Y1 side is the upper side in FIG. 2, and the Y2 side is the lower side in FIG. 2.

The painting robot according to the present embodiment "coats" an painting object, such as a vehicle or a vehicle part (hereinafter, a vehicle part that is a part of a vehicle is also described as a vehicle), which is located in a painting line of an automobile manufacturing plant, and it is aimed at forming a painting film on the surface of the painting object, providing its surface with protection and aesthetics. Therefore, it is necessary to coat approaching vehicles moving along the painting line every prescribed time with desired painting quality within a certain time period.

In addition, in the painting robot of the present embodiment, not only the above-mentioned painting film can be formed, but also various designs and images can be formed on painting objects such as vehicles and vehicle parts.
(1-1. Overall Structure of Injection Type Vehicle Painting Machine)

Figure 1:
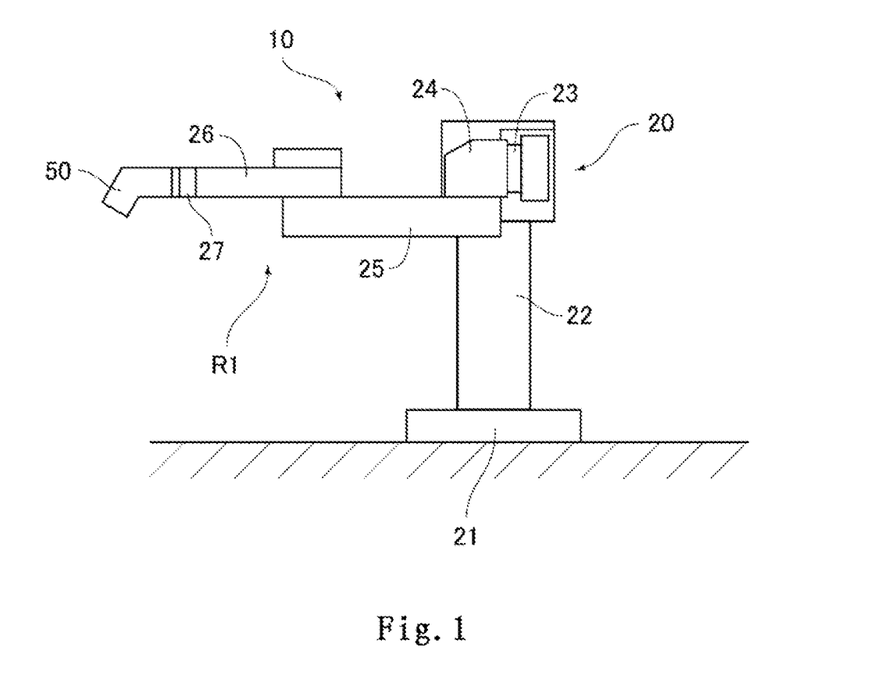
FIG. 1 is a schematic diagram showing the overall structure of a painting robot according to an embodiment of the present disclosure.

FIG. 1 is a schematic diagram showing the overall structure of a painting robot 10 according to the first embodiment of the present disclosure. As shown in FIG. 1, the main components of the painting robot 10 include a robot body 20 and a nozzle head unit 50.
(1-2. Painting Device Body)

As shown in FIG. 1, the main components of the robot body 20 include a base 21, a leg portion 22, a rotating shaft portion 23, a rotating arm 24, a first revolving arm 25, a second revolving arm 26, a wrist portion 27, and a motor (not shown) for driving them. Additionally, although the portion from the rotating shaft portion 23 to the wrist portion 27 corresponds to the robot arm R1, other portions such as the leg portion 22 may also correspond to the robot arm R1.

Among those, although the base 21 is a portion set at a setup location such as a floor face, the base 21 may also be travelable relative to the setup location. In addition, the leg portion 22 is a portion vertically arranged from the base 21 toward the upper side. Further, a joint portion may be provided between the leg portion 22 and the base 21 so that the leg portion 22 is revolvable relative to the base 21.

In addition, the rotating shaft portion 23 is provided at the upper end of the leg portion 22. The rotating arm 24 is mounted to the rotating shaft portion 23 in a rotatable state. In addition, the rotating arm 24 rotates through the drive of a motor (first motor) and an electric motor or a pneumatic motor may be used as the motor. In addition, when the painting robot 10 is arranged in an explosion-proof area and an electric motor is used, it is preferable to take an explosion-proof measure, such as increasing the internal pressure in the housing of the rotating shaft portion 23 (using an internal pressure explosion-proof structure) (the same shall apply for the following electric motors (the second to sixth motors)). However, when the painting robot 10 is arranged in a location other than an explosion-proof area, the above explosion-proof measures may not be taken. Further, the explosion-proof structure in the vicinity of the nozzle head 53 will be described hereinafter.

In addition, one end side of the first revolving arm 25 is mounted to the rotating arm 24 in a revolvable state. Further, a second motor (not shown) that rotates the first revolving arm 25 relative to the rotating shaft portion 23 may be accommodated in the housing of the rotating arm 24 or may be accommodated in the housing of the first revolving arm 25.

In addition, one end side of the second revolving arm 26 is mounted to the other end side of the first revolving arm 25 via a shaft portion in a swingable state. A third motor (not shown) that rotates the second revolving arm 26 relative to the first revolving arm 25 may be accommodated in the housing of the first revolving arm 25 or may be accommodated in the housing of the second revolving arm 26.

The wrist portion 27 is mounted to the other end side of the second revolving arm 26. The wrist portion 27 is capable of rotational movement around a plurality of (e.g. three) shaft portions in different directions. Thereby, the direction of the nozzle head unit 50 can be accurately controlled. Further, the number of shaft portions may be any number as long as it is more than or equal to two.

Motors (the fourth to sixth motors; not shown) are provided for enabling the rotational movement of such wrist portion 27 around respective shaft portions. Further, although the fourth to sixth motors are accommodated in the housing of the second revolving arm 26, it may be accommodated in other locations.

In addition, the nozzle head unit 50 is mounted to the wrist portion 27 via a holder portion (not shown). That is to say, the nozzle head unit 50 is detachably provided to the wrist portion 27 via the holder portion.

Further, the painting robot 10 including the rotating shaft portion 23, the rotating arm 24, the first revolving arm 25, the second revolving arm 26, the wrist portion 27 and the first to sixth motors for driving them is a robot that can be driven in six axes. However, the painting robot 10 can be a robot driven in any number of axes, as long as it has four or more axes.

(1-3. Nozzle Head Unit)

Figure 2:
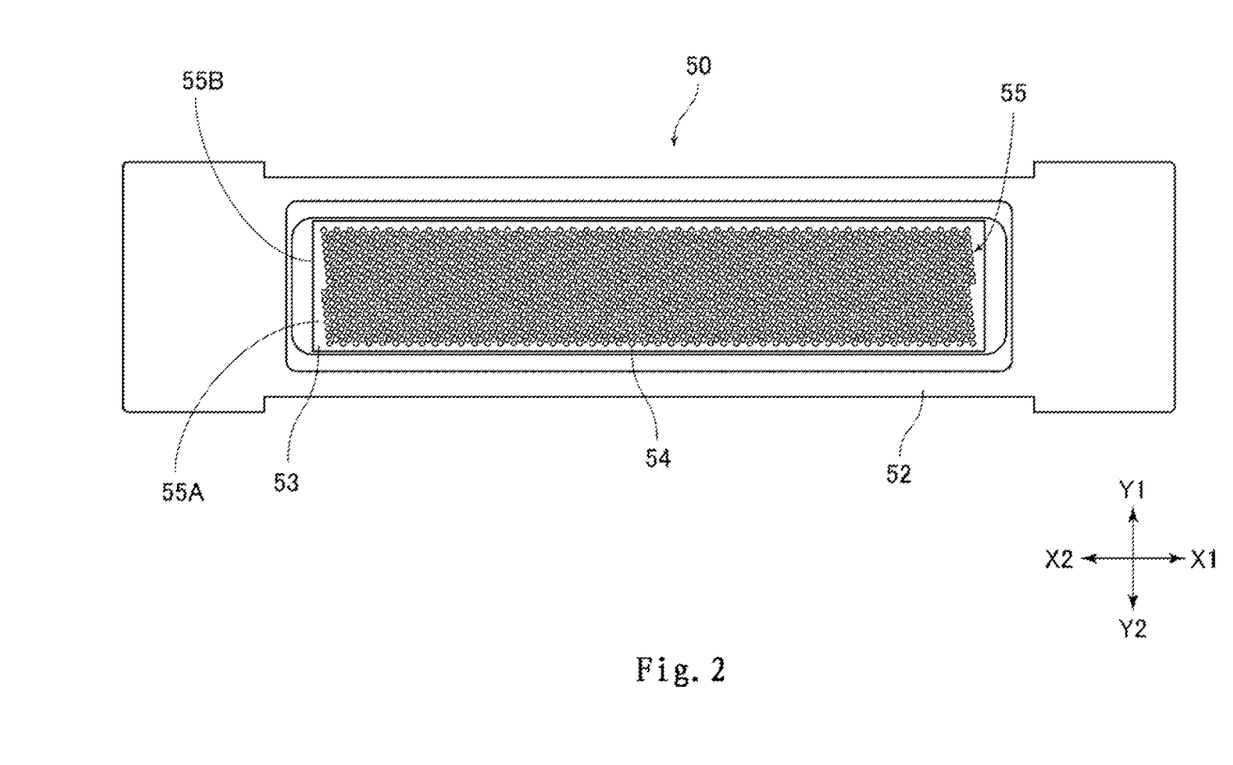
FIG. 2 shows the nozzle discharging surface which discharges paint in the painting robot shown in FIG. 1 from the front.
Figure 3:
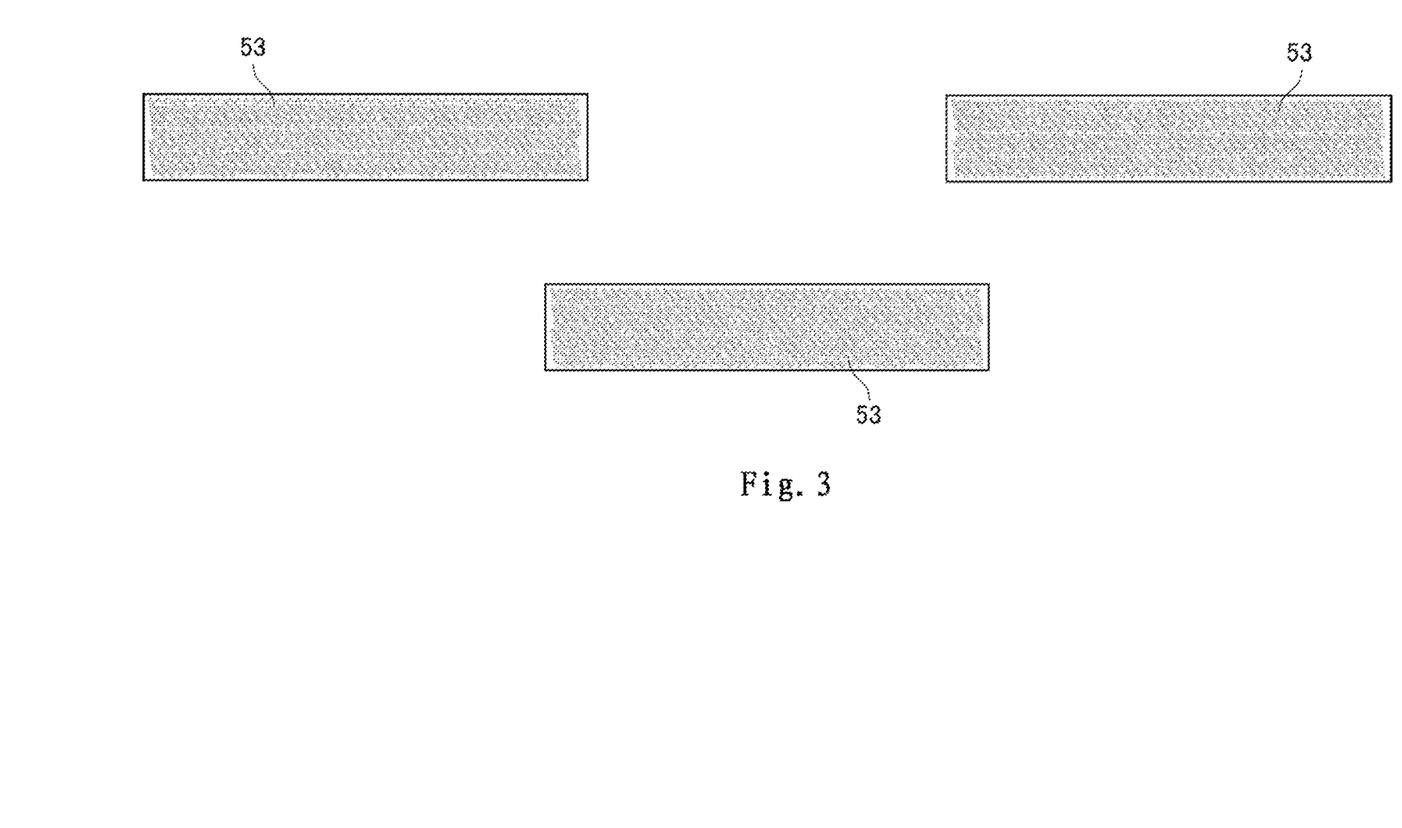
FIG. 3 shows a state in which a plurality of nozzle heads are arranged in a staggered shape in the painting robot shown in FIG. 1.
Figure 4:
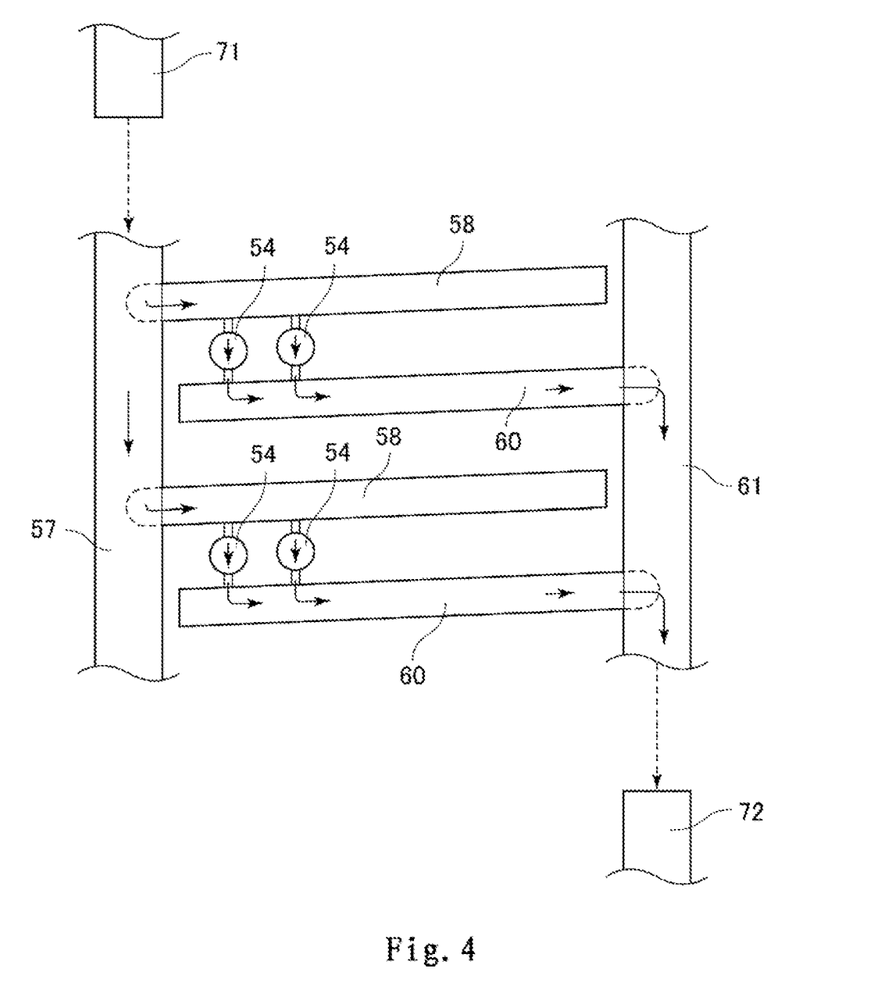
FIG. 4 shows the schematic structure supplying paint to each nozzle in the painting robot shown in FIG. 1.

Next, the nozzle head unit 50 will be described. The nozzle head unit 50 is mounted to the wrist portion 27 via a chuck portion (not shown). As shown in FIGS. 2 to 4, the nozzle head unit 50 includes an explosion-proof housing 70 described later and various structures are built in the explosion-proof housing 70. Further, the structures built in the explosion-proof housing 70 for example includes a head side circulation path (not shown) which is a path for paint circulation, a head control portion 140 and the like.

FIG. 2 shows the nozzle discharging surface 52 which discharges paint in the nozzle head unit 50 from the front. As shown in FIG. 2, the nozzle discharging surface 52 is provided with a plurality of nozzle columns 55 in which the nozzles 54 are lining up in a direction inclined to the width direction of the nozzle head unit 50. In the present embodiment, a first nozzle column 55A located on one side (Y2 side) of the main scanning direction (Y direction) and a second nozzle column 55B (Y1 side) located on the other side of the main scanning direction are provided in such nozzle column 55.

Further, when discharging paint, the driving timings of the nozzles 54 are controlled so that droplets discharged from the nozzles 54 in the second nozzle column 55B impact between droplets discharged from adjacent nozzles 54 in the first nozzle column 55A. Thereby, the point density can be increased during painting.

Meanwhile, as shown in FIG. 2, a single nozzle head 53 is present on the nozzle discharging surface 52. However, a head group consisting of a plurality of nozzle heads 53 may be present on the nozzle discharging surface 52. In this case, as shown in FIG. 3, although as an example, a structure in which the plurality of nozzle heads 53 are aligned and arranged in a staggered shape are illustrated, the arrangement of the nozzle heads 53 in the head group may not be in a staggered shape.

Figure 5:
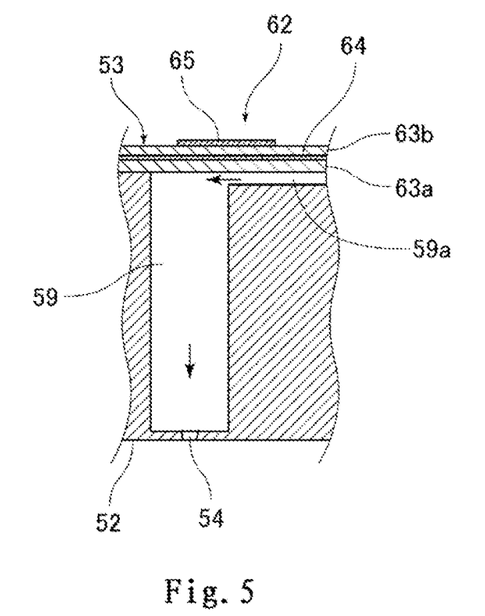
FIG. 5 is a sectional view showing a modified example of the structure in the vicinity of the column-direction supply flow path, the nozzle pressurizing chamber, and the column-direction exhaust flow path shown in FIG. 5.

FIG. 4 shows the schematic structure supplying paint to each nozzle 54. FIG. 5 is a sectional view showing the structure in the vicinity of the column-direction supply flow path 58, the nozzle pressurizing chamber 59, and the column-direction exhaust flow path 60. As shown in FIGS. 4 and 5, the nozzle head 53 includes a supply side large flow path 57, a column-direction supply flow path 58, a nozzle pressurizing chamber 59, a column-direction exhaust flow path 60, and an exhaust side large flow path 61. The supply side large flow path 57 is a flow path through which paint from the supply path 71 of the head side circulation path described later. In addition, the column-direction supply flow path 58 is a flow path through which the paint in the supply side large flow path 57 is diverted.

In addition, the nozzle pressurizing chamber 59 is connected to the column-direction supply flow path 58 via the nozzle supply flow path 59a. Thereby, paint is supplied from the column-direction supply flow path 58 to the nozzle pressurizing chamber 59. The nozzle pressurizing chamber 59 is provided corresponding to the number of nozzles 54 and the paint therein can be discharged from the nozzles 54 using a driving element described later.

In addition, the nozzle pressurizing chamber 59 is connected to the column-direction exhaust flow path 60 via a nozzle exhaust flow path (not shown). Therefore, paint not discharged from the nozzles 54 is exhausted from the nozzle pressurizing chamber 59 to the column-direction exhaust flow path 60 via the nozzle exhaust flow path 59b. In addition, the column-direction exhaust flow path 60 is connected to the exhaust side large flow path 61. The exhaust side large flow path 61 is a flow path in which the paint exhausted from respective column-direction exhaust flow paths 60 converges. The exhaust side large flow path 61 is connected to the return path 72 of the head side circulation path.

With this structure, the paint supplied from the supply path 71 of the head side circulation path is discharged from the nozzles 54 via the supply side large flow path 57, the column-direction supply flow path 58, the nozzle supply flow path 59a, and the nozzle pressurizing chamber 59. In addition, paint not discharged from the nozzles 54 passes through the nozzle exhaust flow path 59b, the column-direction exhaust flow path 60 and the exhaust side large flow path 61 from the nozzle pressurizing chamber 59, and returns to the return path 72 of the head side circulation path.

Further, in the structure shown in FIG. 4, one column-direction exhaust flow path 60 is arranged corresponding to one column-direction supply flow path 58. However, a plurality of (e.g. two) column-direction exhaust flow paths 60 may also be arranged corresponding to one column-direction supply flow path 58. In addition, one column-direction exhaust flow path 60 may also be arranged corresponding to a plurality of column-direction supply flow paths 58.

In addition, as shown in FIG. 5, the piezoelectric substrate 62 is arranged on the top surface (the surface opposite to the nozzles 54) of the nozzle pressurizing chamber 59. The piezoelectric substrate 62 includes two piezoelectric ceramic layers 63a and 63b which are piezoelectric bodies and includes a common electrode 64 and an individual electrode 65. The piezoelectric ceramic layers 63a and 63b are members that can be expanded and contracted by applying a voltage from the outside. As such piezoelectric ceramic layers 63a and 63b, ceramic materials with ferroelectricity, such as lead zirconate titanate (PZT) based, NaNbO3 based, BaTiO3 based, (BiNa) NbO3 based and BiNaNb5O15 based materials, can be used.

In addition, as shown in FIG. 5, the common electrode 64 is arranged between the piezoelectric ceramic layer 63a and the piezoelectric ceramic layer 63b. In addition, a surface electrode (not shown) for the common electrode is formed on the upper surface of the piezoelectric substrate 62. The common electrode 64 and the surface electrode for the common electrode are electrically connected via a through conductor (not shown) present in the piezoelectric ceramic layer 63a. In addition, the individual electrodes 65 are respectively provided at positions facing the above nozzle pressurizing chambers 59. Furthermore, a portion of the piezoelectric ceramic layer 63a sandwiched between the common electrode 64 and the individual electrode 65 is polarized in the thickness direction. Therefore, in response to applying a voltage to the individual electrode 65, the piezoelectric ceramic layer 63a is strained due to the piezoelectric effect. For this reason, in response to applying a prescribed driving signal to the individual electrode 65, the piezoelectric ceramic layer 63b varies relatively so as to reduce the volume of the nozzle pressurizing chamber 59, thereby discharging the paint.

Figure 6:
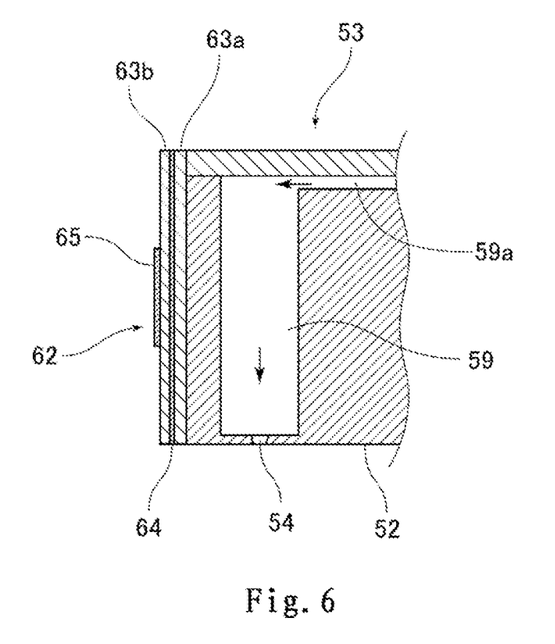
FIG. 6 is a sectional view showing a modified example of the structure in the vicinity of the column-direction supply flow path, the nozzle pressurizing chamber, and the column-direction exhaust flow path shown in FIG. 6.

Further, although in the structure shown in FIG. 5, the common electrode 64 is arranged on the top surface of the nozzle pressurizing chamber 59, it is not limited to this structure. For example, as shown in FIG. 6, the common electrode 64 may be arranged on the side surface of the nozzle pressurizing chamber 59, and any other structure may be adopted as long as the paint can be well discharged from the nozzles 54.

(1-4. Other Structures of the Nozzle Head Unit)

Figure 7:
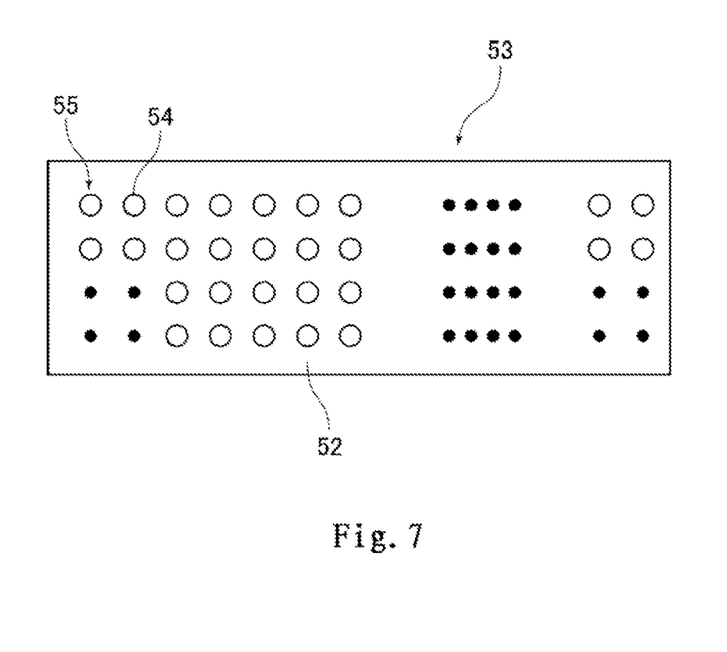
FIG. 7 is a plan view showing the structure of a nozzle discharging surface of a further nozzle head unit different from the nozzle head unit shown in FIG. 2.

Next, other structures of the nozzle head unit will be described. FIG. 7 is a plan view showing the structure of a nozzle discharging surface 52 of a further nozzle head unit. As shown in FIG. 7, a nozzle column 55 may be constituted by arranging a plurality of nozzles 54 in the short direction (width direction; Y direction) of the nozzle head 53. Further, although in the structure shown in FIG. 7, a nozzle column 55 is constituted by arranging a plurality of nozzles 54 in the short direction (width direction; the main scanning direction) of the nozzle head 53, a structure in which only one (single) nozzle 54 is arranged in the short direction (width direction; the main scanning direction) of the nozzle head 53 may be adopted. That is to say, the nozzle column 55 may be constituted by one nozzle 54.

In addition, when painting a vehicle 200 using the nozzle head 53 shown in FIG. 7, painting may be performed in a state in which the long direction of the nozzle head 53 is slightly inclined to the main scanning direction of the nozzle head 53. For example, in the structure of the nozzle head 53 shown in FIG. 2, the long direction of the nozzle head 53 may be inclined to the main scanning direction of the nozzle head 53 by an angle α if the nozzle column 55 is inclined to the main scanning direction by an angle α. With this inclination, the same painting as the nozzle head 53 shown in FIG. 2 can be achieved by only adjusting the discharging timing of the paint from the nozzles 54.

(1-5. Detailed Structure of the Nozzle Head Unit and the Temperature Sensor)

Figure 8:
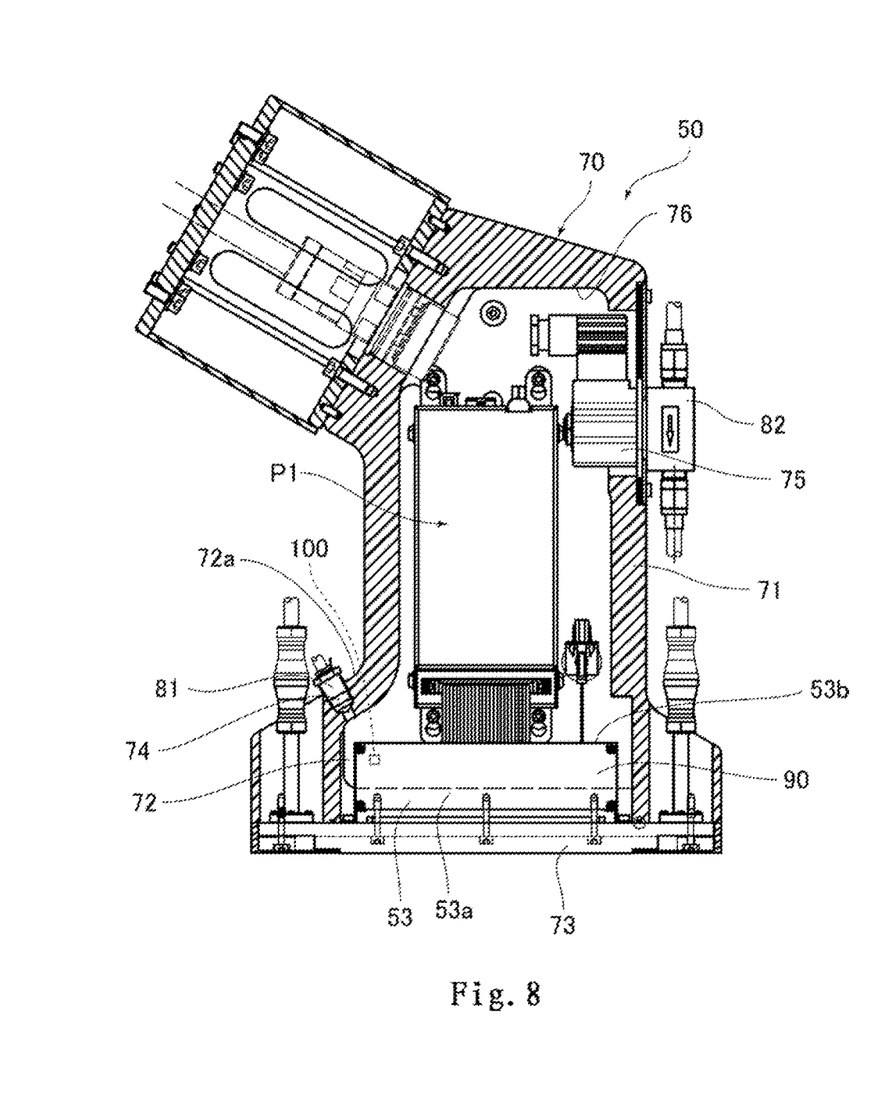
FIG. 8 is a sectional view showing the structure of the nozzle head unit shown in FIG. 2.
Figure 9:
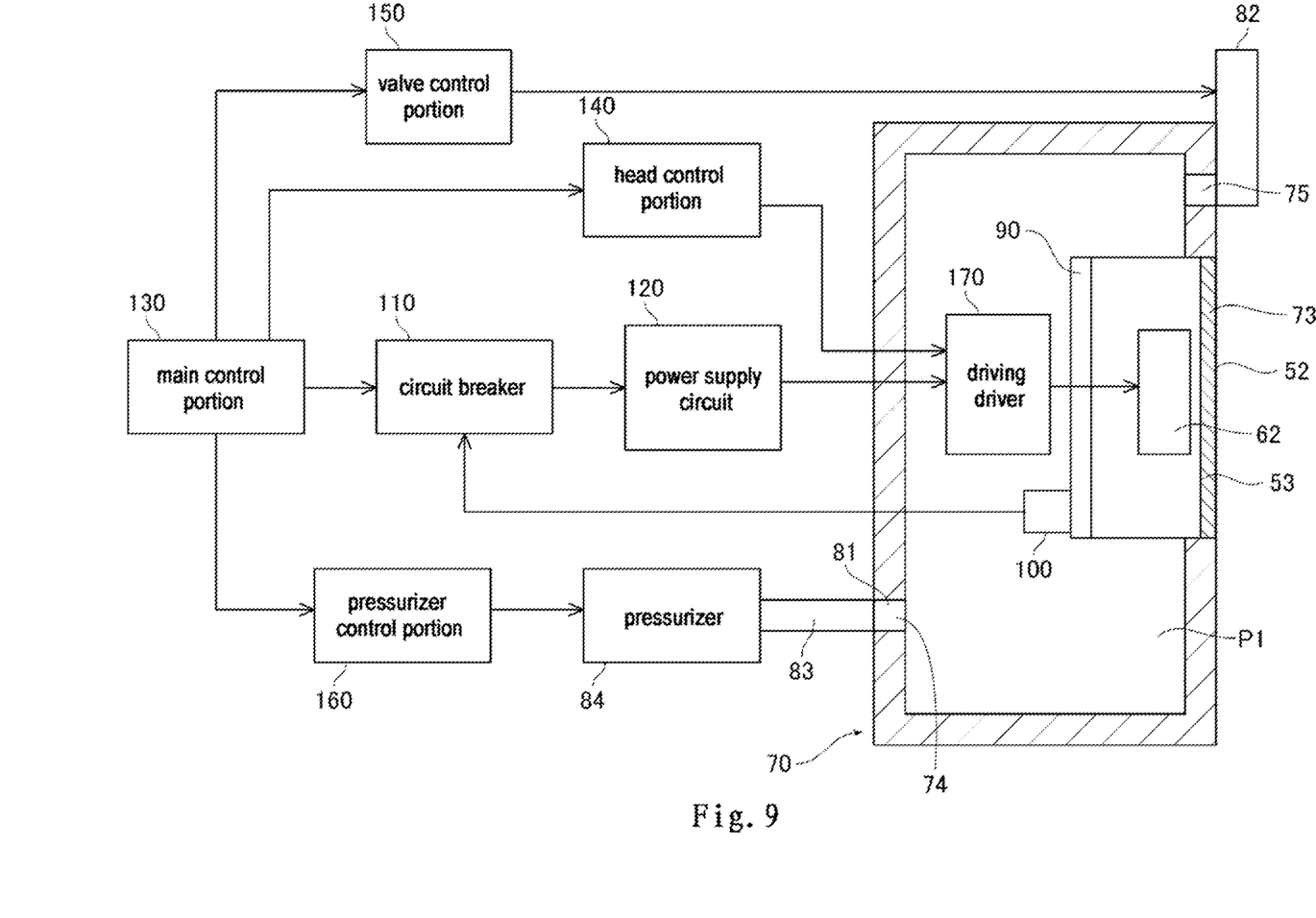
FIG. 9 is a block diagram showing the electrical structure in the vicinity of the nozzle head unit shown in FIG. 8.

Next, the detailed structure of the nozzle head unit 50 and the temperature sensor will be described. FIG. 8 is a sectional view showing the structure of the nozzle head unit 50. FIG. 9 is a block diagram showing the electrical structure in the vicinity of the nozzle head unit 50. As shown in FIGS. 8 and 9, the nozzle head unit 50 has an explosion-proof housing 70.

The explosion-proof housing 70 has an internal space P1 sealed from the external atmosphere and adopts an internal pressure explosion-proof structure which increases the internal pressure of the internal space P1 thereof by supplying inactive gas from the gas supply coupling 81 (the internal pressure of the internal space P1 is higher than the pressure of the external atmosphere). In addition, the internal space P1 of the explosion-proof housing 70 is sealed so as to prevent ignition of the external atmosphere through all the junction portions and opening portions isolating the internal space P1. In addition, by keeping the pressure of the non-flammable inactive gas in the internal space P1 higher than the pressure of the external atmosphere, the flammable gas for pressurizing in the external atmosphere is prevented from invading the internal space P1. With this structure which increases the internal pressure, the explosion-proof performance of the explosion-proof housing 70 is also ensured.

Here, a cylindrical portion 71 covering the above internal space P1, an expanded portion 72 and a front cover 73 are present in the explosion-proof housing 70. Among those, the cylindrical portion 71 is a portion configured in a cylindrical shape (e.g. a rectangular cylindrical shape) in which portions with the same width (cross-sectional area) are continuous. However, a part of the width (cross-sectional area) of the cylindrical portion 71 may also be different. Further, the cylindrical portion 71 includes various shapes such as a rectangular shell, a round cylindrical shell and the like.

In addition, the expanded portion 72 is the part which has an expanded portion whose width (cross-sectional area) is expanded compared to the cylindrical portion 71, and the nozzle head 53 is arranged on the expanded portion 72 using such expansion. In addition, the front cover 73 is mounted on the opening side of the expanded portion 72. That is to say, the front cover 73 is mounted to an opening portion of the explosion-proof housing 70 away from the wrist portion 27. And the nozzle head 53 is mounted through the front cover 73. That is to say, the front cover 73 is provided with an opening portion for mounting (not shown), and the nozzle head 53 is mounted to the front cover 73 in a state in which the nozzle discharging surface 52 of the nozzle head 53 is exposed from the opening portion for mounting.

In addition, the explosion-proof housing 70 is provided with a gas introduction opening 74 and the gas supply coupling 81 is mounted to the gas introduction opening 74. The gas introduction opening 74 is provided in the expanded outer peripheral wall 72a in the above-mentioned expanded portion 72. Here, the expanded outer peripheral wall 72a is the wall surface facing the nozzle head 53 in FIG. 8. However, although the expanded outer peripheral wall 72a is a wall surface which face the top surface of the nozzle head 53 at a prescribed angle instead of facing it parallelly, it may also be formed so as to face the top surface of the nozzle head 53 parallelly. Further, although the gas supply coupling 81 corresponds to the gas supplier, at least one of the pressurizing pipeline 83 and the pressurizer 84 other than the gas supply coupling 81 may also correspond to the gas supplier.

By providing the expanded outer peripheral wall 72a with the gas introduction opening 74, the gas supply coupling 81 can spray inactive gas towards the nozzle head 53. Further, in the state in which the piezoelectric substrate 62 is operating (heating state), inactive gas is maintained at a temperature sufficiently lower than the heat-release plate 90 described later.

In addition, a pressurizing pipeline 83 shown in FIG. 9 is connected to the gas supply coupling 81, and a pressurizer 84 such as a compressor is connected to the pressurizing pipeline. Further, in FIG. 8, the gas introduction opening 74 is disposed in the vicinity of the nozzle head 53 and inactive gas can be supplied towards the nozzle head 53.

In addition, the explosion-proof housing 70 is provided with a gas exhaust opening 75. A gas control valve 82 such as a proportional control valve is mounted to the gas exhaust opening 75. In addition, the gas control valve 82 corresponds to the gas exhauster. With such a gas control valve 82, the flow rate of exhausting inactive gas can be adjusted to adjust the pressure of the internal space P1.

Here, the gas control valve 82 is mounted in the internal space P1 of the explosion-proof housing 70 and on the wall surface of the explosion-proof housing 70 opposite to the gas supply coupling 81 across the nozzle head 53. As an example of the mounting position of such a gas control valve 82, although FIG. 8 shows a case where the gas control valve 82 is mounted closer to the ceiling surface 76 away from the nozzle discharging surface 52 than the center of the internal space P1, the mounting position of the gas control valve 82 is not limited thereto and may be any position as long as it is a wall surface of the explosion-proof housing 70 opposite to the gas supply coupling 81 across the nozzle head 53. In addition, if the cooling performance of the nozzle head 53 can be sufficiently ensured, the gas control valve 82 may also be mounted on the wall surface of the explosion-proof housing 70 on the same side as the gas supply coupling 81 with respect to the nozzle head 53.

As shown in FIGS. 8 and 9, the heat-release plate 90 is mounted to the nozzle head 53. The heat-release plate 90 is mounted to the side surface 3a of the nozzle head 53 which is the surface intersecting with the nozzle discharging surface 52. Thereby, heat generated from the nozzle head 53 can be released in a relatively large area. Further, the heat-release plate 90 corresponds to the heat-release unit.

Further, since there are two side surfaces 53a, it is preferable to mount heat-release plates 90 on respective side surfaces 53a. However, if sufficient heat release performance can be obtained with one heat-release plate 90, it may also be mounted on only one of the two side surfaces 53a. In addition, the heat-release plate 90 may also be mounted on the top surface 53B opposite to the nozzle discharging surface 52.

In addition, although the heat-release plate 90 is made of an aluminum-based metal having better thermal conductivity than iron or the like and having excellent machining performance, copper having better thermal conductivity than aluminum-based metals may also be adopted. In addition, it may also be configured to have a plurality of fins for increasing the surface area of the heat-release plate 90.

In addition, a temperature sensor 100 is mounted to the heat-release plate 90 and the temperature sensor 100 measures the temperature of the heat-release plate 90. Further, the temperature sensor 100 may be for example a PTC (Positive Temperature Coefficient) thermistor, an NTC (Negative Temperature Coefficient) thermistor, a thermocouple, an RTD (Resistance Temperature Detector), a semiconductor temperature sensor, and the like. Further, the temperature sensor 100 corresponds to the temperature measuring unit.

The temperature sensor 100 is connected to a circuit breaker 110 outside the explosion-proof housing 70 via a signal line not shown. The circuit breaker 110 cuts off the power supply to the nozzle head 53 and is mounted to power lines before and after the power supply circuit 120 (in FIG. 9, the main control portion 130 away from the nozzle head 53) which supplies power for driving to the driving driver 170. Further, the power supply circuit 120 corresponds to the power supplier. Further, the circuit breaker 110 corresponds to the power cut-off device.

In response to the above temperature sensor 100 detecting that the temperature of the nozzle head 53 (heat-release plate 90) is greater than or equal to a predetermined temperature, the circuit breaker 110 operates to force the power supply to the nozzle head 53 to stop. Thereby, the temperature of the nozzle head 53 is prevented from rising above the predetermined temperature.

Further, as shown in FIG. 9, the painting robot 10 is provided with a main control portion 130, the main control portion 130 transmits predetermined control signals to the head control portion 140, the valve control portion 150 and the pressurizer control portion 160 so that all the portions of the painting robot 10 cooperate to coat a painting object. Further, although the main control portion 130 and the valve control portion 150 constitute the controller, the control unit may be constituted by at least one of the main control portion 130, the valve control portion 150 and the pressurizer control portion 160.

Further, in the structure shown in FIG. 9, the above-mentioned circuit breaker 110 is disposed between the main control portion 130 and the power supply circuit 120. Therefore, in response to the operation of the circuit breaker 110, since the power supply to the power supply circuit 120 is forced to stop, power is not supplied to the driving driver 170 for driving the nozzle head 53. Therefore, the driving of the piezoelectric substrate 62 is stopped. However, a controller different from the structure shown in FIG. 9 may be configured. For example, the above-mentioned circuit breaker 110 may be disposed at least one of between the main control portion 130 and the head control portion 140, between the power supply circuit 120 and the driving driver 170 and between the head control portion 140 and the driving driver 170.

Further, the main control portion 130, the head control portion 140, the valve control portion 150 and the pressurizer control portion 160 include a CPU, a memory (ROM, RAM, non-volatile memory, etc.), and other elements. In addition, programs and data for executing the desired control is stored in the memory.

Here, the head control portion 140 transmits control signals related to images to the driving driver 170 based on instructions from the main control portion 130. In addition, the valve control portion 150 controls the operation of the gas control valve 82 based on instructions from the main control portion 130. In addition, the pressurizer control portion 160 controls the operation of the pressurizer 84 based on instructions from the main control portion 130. In addition, the driving driver 170 controls application of power for driving the piezoelectric substrate 62 within the nozzle head 53 based on instructions from the head control portion 140.

[Functions]

Next, the functions of the painting robot 10 having the above-mentioned structure will be described below. Here, the head control portion 140 transmits control signals related to images to the driving driver 170 based on instructions from the main control portion 130. In addition, the head control portion 140 transmits control signals related to images for painting to the driving driver 170 based on instructions from the main control portion 130. Then, by driving the piezoelectric substrate 62, the temperature of the nozzle head 53 rises.

Here, the heat-release plate 90 is mounted to the nozzle head 53. Therefore, the heat generated by the nozzle head 53 is released from the heat-release plate 90 to the internal space P1. Further, inactive gas is supplied from the gas supply coupling 81 to the internal space P1. Moreover, the gas supply coupling 81 is mounted to the expanded outer peripheral wall 72a and inactive gas is sprayed towards the heat-release plate 90. Therefore, the heat-release plate 90 is easily cooled by inactive gas.

Further, inactive gas in the internal space P1 is exhausted from the gas control valve 82 mounted to the gas exhaust opening 75. Here, by controlling the gas control valve 82 by the valve control portion 150, the flow rate of the inactive gas exhausted from the internal space P1 is adjusted. Thereby, the pressure of the internal space P1 is for example adjusted to be higher than the pressure of the external atmosphere.

Here, the temperature sensor 100 is mounted to the heat-release plate 90 and the temperature sensor 100 measures the temperature of the heat-release plate 90. And in response to the temperature measured by the temperature sensor 100 reaching a temperature that is not suitable for driving the nozzle head 53 (predetermined temperature), a detection signal indicating that such predetermined temperature has been reached is transmitted to the circuit breaker 110. Then, the circuit breaker 110 immediately cuts off the power supply to the power supply circuit 120. Thereby, the driving of the nozzle head 53 is forcibly stopped.

Further, although the above-mentioned predetermined temperature is higher than the temperature of the external atmosphere, the temperatures can be set to various values. As an example, it can be set to 125 degrees, 120 degrees, 100 degrees and 80 degrees. In addition, the predetermined temperature may be set to a temperature other than these temperatures.

[Effects]

The injection type painting robot 10 having the above configuration includes a nozzle head 53 including a plurality of nozzles and discharging paint from the nozzles 54 by driving of a piezoelectric substrate 62; a power supplier (power supply circuit 120) for supplying power for driving the piezoelectric substrate 62; and a robot arm R1 with a front end to which the nozzle head 53 can be mounted and moving the mounted nozzle head 53.

And the nozzle head 53 is provided, in a state in which the nozzle discharging surface 52 thereof is exposed to the outside, within an explosion-proof housing 70 that has an explosion-proof structure for covering the portions other than the nozzle discharging surface 52 and preventing damage even when an explosion occurs in the internal space P1, thereby preventing ignition of the external atmosphere. In addition, within the explosion-proof housing 70, a heat-release unit (heat-release plate 90) which release the heat generated from the nozzle head 53 is mounted to the nozzle head 53, and within the explosion-proof housing 70, a temperature measuring unit (temperature sensor 100) which measures the temperature of the heat-release unit (heat-release plate 90) is mounted to the heat-release unit (heat-release plate 90). In addition, it is provided with a power cut-off device (circuit breaker 110) which cuts off the power supply from the power supplier (power supply circuit 120) to the piezoelectric substrate 62. In response to the temperature measuring unit (temperature sensor 100) detecting that a predetermined temperature has been reached, the power cut-off device (circuit breaker 110) cuts off the power supply to the power supplier (power supply circuit 120) based on the detection signal from the temperature measuring unit (temperature sensor 100).

Configured in this way, the temperature measuring unit (temperature sensor 100) is mounted to the heat-release unit (heat-release plate 90), and when the temperature measuring unit (temperature sensor 100) is mounted to the heat-release unit (heat-release plate 90) and In response to the temperature measuring unit (temperature sensor 100) detecting that a predetermined temperature has been reached, the power cut-off device (circuit breaker 110) cuts off the power supply to the power supplier (power supply circuit 120). Therefore, the temperature rise of the nozzle head 53 can be suppressed to be less than or equal to the predetermined temperature (less than or equal to a constant temperature). Therefore, an abnormal temperature rise in the nozzle head 53 can be prevented.

Therefore, it is possible to prevent accidental explosion in the internal space P1 and the external atmosphere due to the above-mentioned temperature rise. In addition, the piezoelectric substrate 62 in the nozzle head 53 can be prevented from thermal runaway due to temperature rise. In addition, it can also prevent the paint viscosity from increasing and prevent the painting quality from reducing due to the above-mentioned temperature rise.

In addition, since the heat-release unit (heat-release plate 90) is mounted to the nozzle head 53, temperature rise in the internal space P1 can be suppressed.

In addition, since the nozzle head 53 is disposed in the internal space P1 of the explosion-proof housing 70, it is possible to isolate the portions where the temperature rise is significant from the external atmosphere. Therefore, even if an explosion occurs in the internal space P1, or spark and the like occurs in an electrically driven portion such as the piezoelectric substrate 62, the external atmosphere can be prevented from being influenced thereby.

In addition, in the above-mentioned embodiment, the explosion-proof housing 70 has an internal pressure explosion-proof structure in which the internal pressure of the internal space P1 thereof is higher than the pressure of the external atmosphere. With this structure, it is possible to well prevent the external atmosphere from flowing into the internal space P1. Thereby, the explosion-proof performance of the explosion-proof housing 70 can be improved.

In addition, in the above-mentioned embodiment, the heat-release unit is a heat-release plate 90, and the heat-release plate 90 is mounted to the side surface 53a of the nozzle head 53 intersecting with the nozzle discharging surface 52.

With this structure, the heat-release plate 90 having an equally large area can be mounted on the side surface 53a having a relatively large area. Therefore, the cooling performance of the nozzle head 53 can be improved.

In addition, in the present embodiment, the explosion-proof housing 70 includes a gas supplier (gas supply coupling 81) mounted to a gas introduction opening 74 formed in the explosion-proof housing 70, and a gas exhauster (gas control valve 82) mounted to a gas exhaust opening 75 formed in the explosion-proof housing 70. Then the inactive gas is introduced from the gas introduction opening 74 and exhausted from the gas exhauster (gas control valve 82).

With this configuration, inactive gas is supplied from the gas supplier (gas supply coupling 81) to the internal space P1 of the explosion-proof housing 70, and the inactive gas is exhausted from the gas exhauster (gas control valve 82). Therefore, inactive gas can circulate within the internal space P1 and heat released from the heat-release unit (heat-release plate 90) can be well exhausted to the outside. Thereby, the cooling performance of the nozzle head 53 can be further improved.

In addition, in the present embodiment, the explosion-proof housing 70 is provided with a cylindrical portion 71 and an expanded portion 72 expanded in a state that its size in the width direction is larger than the outer peripheral surface of the cylindrical portion 71. In addition, the gas supplier (gas supply coupling 81) is mounted on the expanded outer peripheral wall 72a of the expanded portion 72 facing the heat-release unit (heat-release plate 90), so that the gas supplier (gas supply coupling 81) sprays inactive gas towards the heat-release unit (heat-release plate 90).

With this structure, since the cylindrical portion 71 has a narrower width and a smaller cross-sectional area than the expanded portion 72, the weight of the explosion-proof material (metal, resin or the like) used for the cylindrical portion 71 can be reduced. Therefore, the behavior of the robot arm R1 can be improved. In addition, since the gas introduction opening 74 can be formed in the expanded outer peripheral wall 72a of the expanded portion 72 due to the presence of the expanded portion 72, fresh inactive gas (with relatively lower temperature than the internal space P1) may be sprayed from the gas supplier (gas supply coupling 81) towards the heat-release unit (heat-release plate 90). Thereby, the cooling performance of the nozzle head 53 can be improved.

In addition, in the present embodiment, the gas exhauster is a gas control valve 82 which is capable of adjusting the flow rate of inactive gas, and the gas control valve 82 is mounted in the internal space P1 of the explosion-proof housing 70 and on the wall surface of the explosion-proof housing 70 opposite to the gas supply coupling 81 across the nozzle head 53.

With this structure, inactive gas introduced from the gas supplier (gas supply coupling 81) can be circulated in the internal space P1. Therefore, it is possible to prevent fresh inactive gas (with relatively lower temperature than the internal space P1) from being immediately exhausted to the outside. Therefore, inactive gas can be effectively used to lower the temperature of the nozzle head 53 and the nozzle head 53 can be better cooled.

In addition, in the present embodiment, it is provided with a controller (valve control portion 150) that controls the operation of the gas control valve 82 and controls the flow rate of the inactive gas exhausted from the gas control valve 82 so that the internal pressure of the internal space P1 is higher than the pressure of the external atmosphere.

With this structure, the internal pressure of the internal space P1 can be higher than the external atmosphere, thereby better preventing the external atmosphere from flowing into the internal space P1. Thereby, the explosion-proof performance of the explosion-proof housing 70 can be further improved by increasing the internal pressure of the internal space P1.

MODIFIED EXAMPLES

Although one embodiment of the present disclosure has been described above, various modifications can be made to the present disclosure except for the above embodiment. An example thereof will be described hereinafter.

In the above-mentioned embodiment, the heat-release plate 90 has been described as the heat-release unit. However, the heat-release unit is not limited to the heat-release plate 90. For example, a cooling fan which forces inactive gas to flow, a water cooling mechanism which cools the nozzle head 53 with cold water and a Peltier element or the like may constitute the heat-release unit in place of or together with the heat-release plate 90.

In addition, in the above-mentioned embodiment, the internal pressure of the internal space P1 is made higher than the external atmosphere by adjusting the flow rate of the inactive gas exhausted from the gas control valve 82. However, the internal pressure of the internal space P1 may be controlled so as to be higher than the external atmosphere by controlling the operation of the pressurizer 84 with the pressurizer control portion 160.

In addition, in the above-mentioned embodiment, the temperature sensor 100 is mounted to the heat-release plate 90 corresponding to the heat-release unit. However, the temperature sensor 100 may also be mounted to the nozzle head 53 other than the heat-release plate 90 and a member fixed to the nozzle head 53.

In addition, in the above-mentioned embodiment, the explosion-proof housing 70 adopts an internal pressure explosion-proof structure as the explosion-proof structure. However, the explosion-proof structure of the explosion-proof housing 70 may also be an explosion-proof structure other than the internal pressure explosion-proof structure. For example, the explosion-proof housing 70 may adopt a pressure-resistant explosion-proof structure consisting of a pressure-resistant material, may adopt an increased safety explosion-proof structure or may adopt other explosion-proof structures.

REFERENCE SIGNS LIST 10 painting robot, 20 robot body, 21 base, 22 leg portion, 23 rotating shaft portion, 24 rotating arm, 25 first revolving arm, 26 second revolving arm, 27 wrist portion, 30 chuck portion, 40 paint supply portion, 50 nozzle head unit, 51 head cover, 52 nozzle discharging surface, 52a side surface, 53 nozzle head, 53a side surface, 53b top surface, 54 nozzle, 54A nozzle, 54B nozzle, 55 nozzle column, 55A first nozzle column, 55B second nozzle column, 57 supply side large flow path, 58 column-direction supply flow path, 59 nozzle pressurizing chamber, 59a nozzle supply flow path, 59b nozzle exhaust flow path, 60 column-direction exhaust flow path, 61 exhaust side large flow path, 62 piezoelectric substrate, 63a piezoelectric ceramic layer, 63b piezoelectric ceramic layer, 64 common electrode, 65 individual electrode, 70 explosion-proof housing, 71 supply path, 71 cylindrical portion, 72 return path, 72 expanded portion, 72a expanded outer peripheral wall, 73 front cover, 74 gas introduction opening, 75 gas exhaust opening, 76 ceiling surface, 81 gas supply coupling (corresponding to the gas supplier), 82 gas control valve (corresponding to the gas exhauster), 83 pressurizing pipeline, 84 pressurizer, 90 heat-release plate (corresponding to the heat-release unit), 100 temperature sensor (corresponding to the temperature measuring unit), 110 circuit breaker (corresponding to the power cut-off device), 120 power supply circuit (corresponding to the power supplier), 130 main control portion, 140 head control portion, 150 valve control portion (corresponding to the controller). 160 pressurizer control portion, 170 driving driver, 200 vehicle, P1 internal space, R1 robot arm.

What is claimed is:

1. A painting robot configured to discharge paint from nozzles towards a painting object to perform painting, comprising:
    a nozzle head comprising a plurality of the nozzles and discharging the paint from the nozzles by a driving of a piezoelectric substrate;
    a power supplier for supplying power for driving the piezoelectric substrate; and
    a robot arm with a front end to which the nozzle head can be mounted and moving the mounted nozzle head,
    wherein the nozzle head is provided, in a state in which a nozzle discharging surface is exposed to the outside, within an explosion-proof housing that covers portions other than the nozzle discharging surface,
    a heat-release unit releasing heat generated from the nozzle head is mounted, within the explosion-proof housing, to the nozzle head, and
    a temperature measuring unit measuring a temperature of the heat-release unit is mounted, within the explosion-proof housing, to the heat-release unit,
    the painting robot is provided with a power cut-off device which, in response to the temperature measuring unit detecting that a predetermined temperature has been reached, cuts off a power supply from the power supplier to the piezoelectric substrate based on a detection signal from the temperature measuring unit.

2. The painting robot of claim 1, wherein the explosion-proof housing comprises an internal pressure explosion-proof structure in which an internal pressure of an internal space is higher than pressure of external atmosphere.

3. The painting robot of claim 2, wherein the heat-release unit is a heat-release plate, and
    the heat-release plate is mounted to a side surface of the nozzle head intersecting with the nozzle discharging surface.

4. The painting robot of claim 3, wherein the explosion-proof housing comprises a gas supplier mounted to a gas introduction opening formed in the explosion-proof housing, and a gas exhauster mounted to a gas exhaust opening formed in the explosion-proof housing, and inactive gas is introduced from the gas supplier and exhausted from the gas exhauster.

5. The painting robot of claim 2, wherein the explosion-proof housing comprises a gas supplier mounted to a gas introduction opening formed in the explosion-proof housing, and a gas exhauster mounted to a gas exhaust opening formed in the explosion-proof housing, and
inactive gas is introduced from the gas supplier and exhausted from the gas exhauster.

6. The painting robot of claim 1, wherein the explosion-proof housing comprises a pressure-resistant explosion-proof structure consisting of a pressure-resistant material.

7. The painting robot of claim 6, wherein the heat-release unit is a heat-release plate, and
the heat-release plate is mounted to a side surface of the nozzle head intersecting with the nozzle discharging surface.

8. The painting robot of claim 7, wherein the explosion-proof housing comprises a gas supplier mounted to a gas introduction opening formed in the explosion-proof housing, and a gas exhauster mounted to a gas exhaust opening formed in the explosion-proof housing, and
inactive gas is introduced from the gas supplier and exhausted from the gas exhauster.

9. The painting robot of claim 6, wherein the explosion-proof housing comprises a gas supplier mounted to a gas introduction opening formed in the explosion-proof housing, and a gas exhauster mounted to a gas exhaust opening formed in the explosion-proof housing, and
inactive gas is introduced from the gas supplier and exhausted from the gas exhauster.

10. The painting robot of claim 1, wherein the heat-release unit is a heat-release plate, and
the heat-release plate is mounted to a side surface of the nozzle head intersecting with the nozzle discharging surface.

11. The painting robot of claim 10, wherein the explosion-proof housing comprises a gas supplier mounted to a gas introduction opening formed in the explosion-proof housing, and a gas exhauster mounted to a gas exhaust opening formed in the explosion-proof housing, and
inactive gas is introduced from the gas supplier and exhausted from the gas exhauster.

12. The painting robot of claim 1, wherein the explosion-proof housing comprises a gas supplier mounted to a gas introduction opening formed in the explosion-proof housing, and a gas exhauster mounted to a gas exhaust opening formed in the explosion-proof housing, and
inactive gas is introduced from the gas supplier and exhausted from the gas exhauster.

13. The painting robot of claim 12, wherein the explosion-proof housing is provided with a cylindrical portion and an expanded portion expanded in a state that its size in a width direction is larger than an outer peripheral surface of the cylindrical portion, and
the gas supplier is mounted on an expanded outer peripheral wall of the expanded portion facing the heat-release unit, so that the gas supplier sprays inactive gas towards the heat-release unit.

14. The painting robot of claim 13, wherein the gas exhauster is a gas control valve which is capable of adjusting a flow rate of the inactive gas, and
the gas control valve is mounted, in the internal space of the explosion-proof housing, on a wall surface of the explosion-proof housing opposite to the gas supplier across the nozzle head.

15. The painting robot of claim 14, wherein the painting robot is provided with a controller that controls an operation of the gas control valve and controls a flow rate of the inactive gas exhausted from the gas control valve so that an internal pressure of the internal space is higher than a pressure of an external atmosphere.

* * * * *

UNITED STATES PATENT AND TRADEMARK OFFICE
CERTIFICATE OF CORRECTION

PATENT NO. : 11,701,678 B1
APPLICATION NO. : 17/753811
DATED : July 18, 2023
INVENTOR(S) : Piotr Stasiak and Takahiro Tawata It is certified that error appears in the above-identified patent and that said Letters Patent is hereby corrected as shown below:

On the Title Page

Replace:
(71) Applicants: ABB Schweiz AG, Baden (CH); Piotr Stasiak, Bryne (NO); Takahiro Tawata, Tokyo (JP)

With:
(71) Applicants: ABB Schweiz AG, Baden (CH)

Signed and Sealed this
Twelfth Day of December, 2023

Katherine Kelly Vidal
*Director of the United States Patent and Trademark Office*